US006304864B1

United States Patent
Liddy et al.

(10) Patent No.: US 6,304,864 B1
(45) Date of Patent: Oct. 16, 2001

(54) SYSTEM FOR RETRIEVING MULTIMEDIA INFORMATION FROM THE INTERNET USING MULTIPLE EVOLVING INTELLIGENT AGENTS

(75) Inventors: Elizabeth D. Liddy, Syracuse; Edmund Szu-Li Yu, Dewitt, both of NY (US)

(73) Assignee: Textwise LLC, Syracuse, NY (US)

( * ) Notice: Subject to any disclaimer, the term of this patent is extended or adjusted under 35 U.S.C. 154(b) by 0 days.

(21) Appl. No.: 09/295,190

(22) Filed: Apr. 20, 1999

(51) Int. Cl.[7] .................................................. G06F 9/445
(52) U.S. Cl. ............................................................. 706/15
(58) Field of Search ................................. 707/4; 706/20, 706/25

(56) References Cited

U.S. PATENT DOCUMENTS

| 5,086,479 | 2/1992 | Takenaga et al. . |
| 5,140,530 | 8/1992 | Guha et al. . |

(List continued on next page.)

FOREIGN PATENT DOCUMENTS

| 0845748A2 | 6/1998 | (EP) . |
| WO 96/23265 | 8/1996 | (WO) . |
| WO 98/02825 | 1/1998 | (WO) . |

OTHER PUBLICATIONS

Intelligent Software Agents on the Internet, by Björn Hermans vol. 2 No. 3—Mar. 3rd, 1997 www.google.com.*
Using an Intelligent Agent to Enhance Search Engine Performance, by James Jansen www.google.com.*

(List continued on next page.)

*Primary Examiner*—Mark R. Powell
*Assistant Examiner*—Michael B. Holmes
(74) *Attorney, Agent, or Firm*—Kenneth J. LuKacher

(57) ABSTRACT

A system for retrieving multimedia information is provided using a computer coupled to a computer-based network, such as the Internet, and particularly the World Wide Web (WWW). The system includes a web browser, a graphic user interface enabled through the web browser to allow a user to input a query representing the information the user wishes to retrieve, and an agent server for producing, training, and evolving first agents and second agents. Each of the first agents retrieves documents (Web page) from the network at a different first network address and at other addresses linked from the document at the first network address. Each of the second agents executes a search on different search engines on the network in accordance with the query to retrieve documents at network addresses provided by the search engine. The system includes a natural language processor which determines the subject categories and important terms of the query, and of the text of each agent retrieved document. The agent server generates and trains an artificial neural network in accordance with the natural language processed query, and embeds the trained artificial neural network in each of the first and second agents. During the search, the first and second agents process through their artificial neural network the subject categories and important terms of each document they retrieve to determine a retrieval value for the document. The graphic user interface displays to the user the addresses of the retrieved documents which are above a threshold retrieval value. The user manually, or the agent server automatically, selects which of the retrieved documents are relevant. Periodically, the artificial neural network of the first and second agents is expanded and retrained by the agent server in accordance with the selected relevant documents to improve their ability to retrieve documents which may be relevant to the query. Further, the agent server can evolve an artificial neural network based on the current artificial neural network, the retrieved documents, and their selected relevancy, by iteratively producing, training, and testing several generations of neural networks to produce an evolved agent. The artificial neural network of the evolved agent then replaces the current artificial neural network used by the agents to search the Internet. One or more concurrent search of the Internet may be provided.

24 Claims, 8 Drawing Sheets

U.S. PATENT DOCUMENTS

| | | |
|---|---|---|
| 5,245,696 | 9/1993 | Stork et al. . |
| 5,295,227 | 3/1994 | Yokono . |
| 5,398,300 | 3/1995 | Levey . |
| 5,586,218 | 12/1996 | Allen . |
| 5,634,053 * | 5/1997 | Nobel et al. .............................. 707/4 |
| 5,701,451 | 12/1997 | Rogers et al. . |
| 5,745,754 | 4/1998 | Lagarde et al. . |
| 5,748,954 | 5/1998 | Mauldin . |
| 5,752,246 | 5/1998 | Rogers et al. . |
| 5,761,663 | 6/1998 | Lagarde et al. . |
| 5,765,028 | 6/1998 | Gladden . |
| 5,781,698 | 7/1998 | Teller et al. . |
| 5,796,396 | 8/1998 | Rich . |
| 5,802,506 * | 9/1998 | Hutchison ............................. 706/20 |
| 5,809,492 | 9/1998 | Murray et al. . |
| 5,819,247 | 10/1998 | Freund et al. . |
| 5,841,947 | 11/1998 | Nordin . |
| 5,848,402 | 12/1998 | Pao et al. . |
| 5,852,814 | 12/1998 | Allen . |
| 5,867,799 | 2/1999 | Lang et al. . |
| 5,873,056 | 2/1999 | Liddy et al. . |
| 5,877,759 | 3/1999 | Bauer . |
| 6,029,161 | 2/2000 | Lang et al. . |
| 6,029,195 | 2/2000 | Herz . |
| 6,038,556 * | 3/2000 | Hutchison ............................. 706/25 |
| 6,055,370 * | 4/2000 | Brown et al. ............................ 717/5 |

OTHER PUBLICATIONS

Excerpts from A. Clark, Being There, MIT Press, 1997.*

Sheth, B. et al., Evolving Agents for Personalized Information Filtering, Proc. of the 9th Conf. on Artificial Intelligence for Applications, Mar. 1993, pp. 345–352.

E.B. Baum and D. Haussler, What size net gives valid generalization? Neural Computation, vol. 1; pp. 151–160, 1989.

E. Carmel, S. Crawford, & H. Chen, Browsing in hypertext: A cognitive study, IEEE Transactions on Systems, Man and Cybernetics, vol. 22, pp. 865–884, 1992.

Y. Chauvin and D.E. Rumelhart (eds.) ackpropagation: theory, architectures, and applications, Lawrence Erlbaum Associates, Hillsdale, N.J., pp. 1–34, 1995.

H. Chen, Y. Chung, and M. Ramsey, A smart itsy bitsy spider for the Web, Journal of the American Society for Information Science, vol. 49, No. 7, pp. 604–618, 1998.

L. Chen and K. Sycara, Webate: A personal agent for browsing and searching, Proceedings of Autonomous Agents 98, pp. 132–138, 1998.

G. Cybenko, Approximation by superposition of a sigmoidal function, Mathematics of Control, Signals and Systems, vol. 2, pp. 303–314, 1989.

Scott Deerwester, Next Generation of Search Engines and Find Their Feet. Financial Times (London Edition), Financial Times: London, England, pp. 14, Aug. 26, 1996.

H. Funahashi, On the approximate realization of continuous mapping by neural networks. Neural Networks, vol. 2, pp. 183–192, 1989.

H. Funahashi, Multilayer neural networks and Bayes decision theory, Neural Networks, vol. 11, pp. 209–213, 1998

W.B. Frakes and R. Baeza–Yates (eds.), Information retrieval: data structures & algorithms, Prentice Hall, Englewood Cliff, N.J., pp. 113–116, 151–160, 1992.

V. Harmandas, M. Sanderson, and M.D. Dunlop, Image retrieval by hypertext links, Proceedings of ACM SIGIR '97 conference,, pp. 296–303, 1997.

K. Hornik, Multilayer feedforward networks are universal approximators, Neural Networks, vol. 2, pp. 359–366, 1989.

T. Joachims, D. Freitag, and T. Mitchell, Web Watcher: A tour guide for the World Wide Web, Proceedings of IJCAI 97, 1998.

E.D. Lindy, W. Paik, E.S. Yu, and M. McKenna, A Natural Language Text Retrieval System with Relevance Feedback Proceedings of the 16th National Online Meeting, pp. 259–261, 1995.

E.D. Liddy, W. Paik, E.S. Yu, and M.E. McKenna, Document retrieval using linguistic knowledge. Proceedings of RIAO '94 Conference, pp. 106–114, 1994.

E.D. Liddy, W. Paik, and E.S. Yu, Text catergorization for multiple user based on semantic Information from a MRD, ACM Transactions on Information Systems, vol. 12, No. 3, pp. 278–295, 1994.

M. Mitchell, An introduction to genetic algorithms, MIT Press, Cambridge, MA, pp. 8–10, 27–31, 65–79, 1996.

D. Michie, D.J. Spiegelhalter, and C.C. Taylor (eds.), Machine Learning, Neural and Statistical Classification, Ellis Horwood, Ltd., pp. 131–146, 152–154, 1994.

H.S. Nwana and D.T. Ndumu, An introduction to agent technology, Software Agents and Soft Computing, Springer, Berlin, pp. 3–26, 1997.

H.S. Nwana, Software agents: an overview, Knowledge Engineering Review, vol. 11, No. 3, pp. 205–244, 1996.

M. Pazzani and D. Billsus, Learning and revising user profiles: the identification of interesting Web sites. Machine learning, vol. 27, 313–331, 1997.

M. Pazzani, J. Muramatzu, D. Billsus, Syskill & webert: identifying interesting web sites. Proceedings of AAAI conference, 1996.

H. Schutze, D.A. Hull, and J.O. Pedersen, A Comparison of Classifiers and Document Representations for the Routing Problem. Proceedings of ACM SIGIR '95 conference, pp. 229–237, 1995.

Laura Smith, Search Tool Time, PC Week, PC Week: New York, NY, pp. 22, Jul. 15, 1996.

H. White, Connectionist nonparametric regression: multilayer feedforward networks can learn arbitrary mappings, Neural Networks, vol. 3, pp. 535–549, 1990.

Autonomy, Inc. website at www.agentware.com, printed Jul. 1999.

Metabot Search Engine web page at metabot.kinetoscope.com/docs/docs.html, printed Jul. 1999.

Wise Wire Corp. Website at www.wisewire.com, printed Jul. 1999.

Autonomy Agentware Technology White Paper, Autonomy Inc., 1998.

Smart Agents Outsmart Search Engines, Newsbytes News Network, Apr. 9, 1998.

EVA Evolving intelligent text–based Agents for geospatial information, at www. textwise.com/eva.html, Jul. 1997.

Jeffrey M. Bradshaw, Software Agents, AAAI Press/The MIT Press, Menlo Park, Calif., Chapter I.

Agents Technologies Introduces Industry's Most Extensive Professional Search Tool, Business Editors & Computer Writers, Business Wire, Mar. 11, 1998.

* cited by examiner

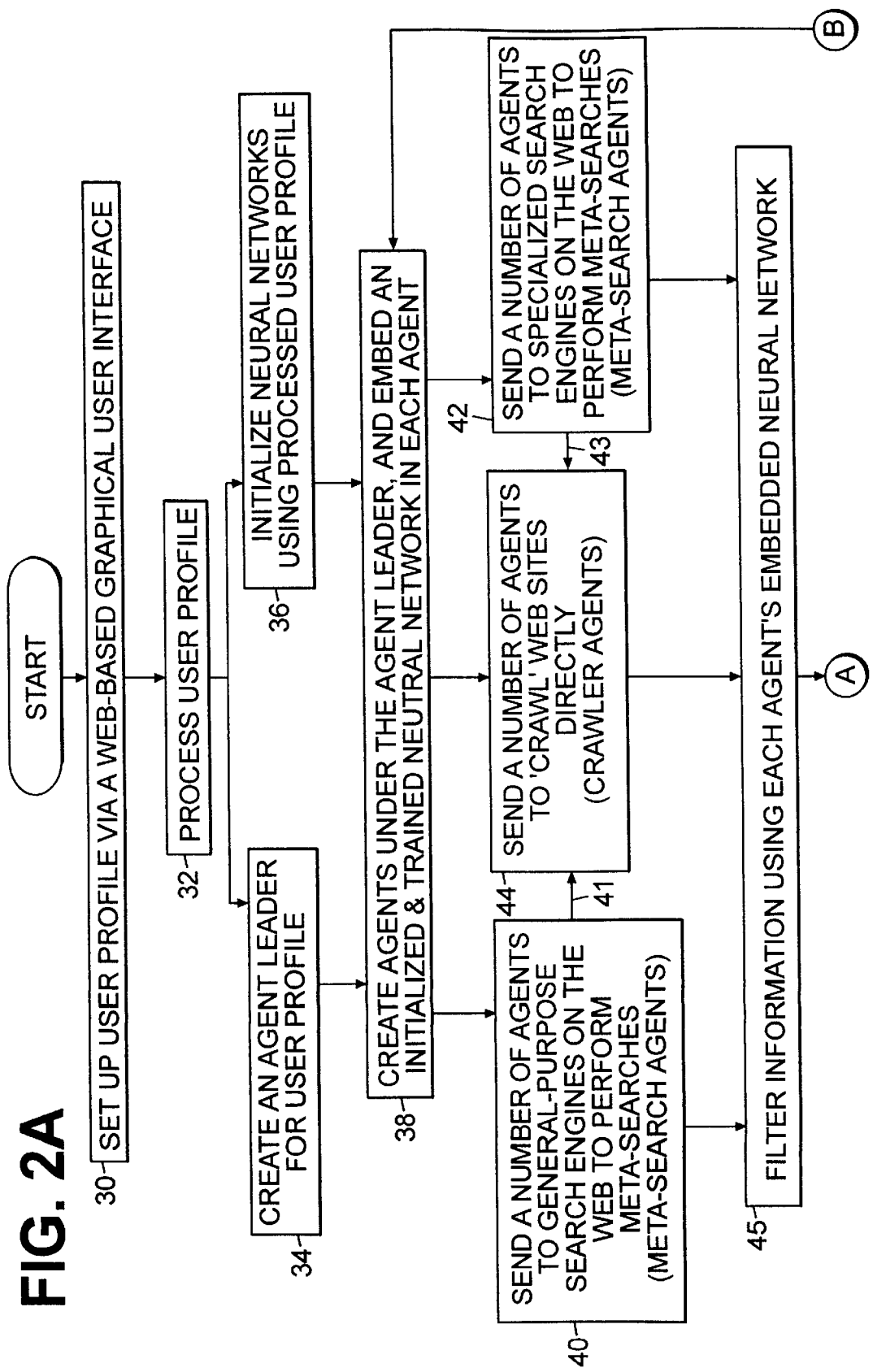

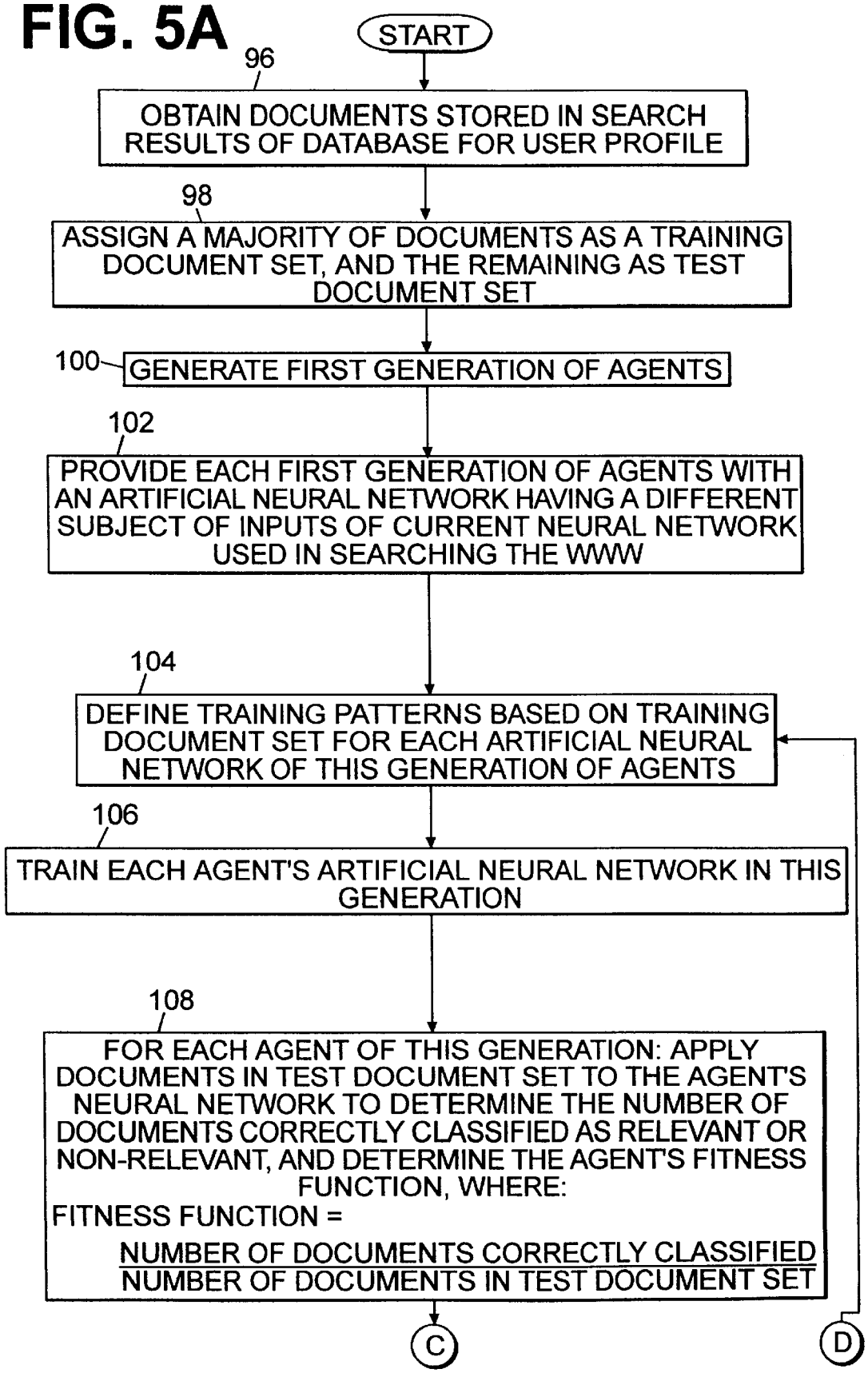

SYSTEM FOR RETRIEVING MULTIMEDIA INFORMATION FROM THE INTERNET USING MULTIPLE EVOLVING INTELLIGENT AGENTS

The U.S. Government has rights in this invention pursuant to grant MNA202-97-1-1025 between the National Imagery Mapping Agency and Syracuse University.

FIELD OF THE INVENTION

The present invention relates to a system (and method) for retrieving multimedia information from a computer-based network, such as the Internet, using multiple evolving intelligent agents, and relates particularly to a system for retrieving information, in terms of documents or Web pages, at network addresses using agents for crawling through the Internet and executing searches on search engines on the Internet to retrieve documents, in accordance with a user inputted query. The system is suitable for a user at a computer coupled to the Internet to automatically retrieve Web pages from the Internet in accordance with a natural language query.

BACKGROUND OF THE INVENTION

The Internet is a worldwide network of computers with a multitude of sites providing a vast amount of information. A major part of the Internet is called the World Wide Web (WWW). It represents the sites on the Internet which operate in accordance with hypertext transfer protocol (HTTP), commonly called Web sites. To access information on the WWW, a Web browser operating on a computer coupled to the Internet allows a user to access to, and the ability to receive Web pages from, the WWW. Each Web page represents a document formatted in a Hypertext Markup Language (HTML) which directs the Web browser on how to display the text, graphics, and hyperlinks of the Web page. Hyperlinks represent graphical regions of a Web page which when selected by a user direct the Web browser to the addresses of other Web pages.

The Web sites may be considered as representing numerous on-line resources. At present, productive use of such on-line resources to the computer user is hampered by the huge amount of information present on the WWW. An excessive amount of time is required to locate useful data, and the dynamic and transient nature of such on-line data often means that information is lost, overlooked or quickly outdated. The result is that on-line users often spend more time searching for information than actually using it. Traditional solutions to this problem include online indexes. Online indexes are usually included in popular search engines on the Internet, such as Alta Vista or Lycos. A user can access the site of a search engine and input a query, and then receive a list of addresses of Web pages which could be relevant to the query. The databases of indexes are continually updated, but generally only offers a first-level filter on information, thus requiring users to search manually for relevant data. Furthermore, due to the great number of Web sites having Web pages, such indexes often include 35% or less of the number of Web pages available on the WWW. An index/retrieval system having a search engine is described, for example, in U.S. Pat. No. 5,748,954.

To build the individual entries on the indexes of Web search engines, software robots or agents are often used to search individual Web pages along the Internet to locate Web pages to include in their index. The software robots are typically called Web crawlers, wanders or spiders, since they continuously search Web pages linked to other Web pages. The process of crawling the WWW is slow and time-consuming due the expansive number of sites on the Internet, and includes rules which necessarily limit the number of terms to be used. Web crawlers for on-line indexes have very limited intelligence, and are focused on identifying search terms to be used in the index to be cross-referenced to Web pages. Moreover, although companies providing Web search engines may use Web crawlers to develop their indexes, a typical computer user does not have access to Web crawlers, and must rely on querying search engines on the Internet to locate Web pages potentially relevant to their needs.

Other approaches for locating information on the Internet include directories and catalogs. Online directories, such as Web-based Yahoo, compile information on popular topics or areas with human aid, but are highly subjective and often too general for many information seekers. Online catalogs are lists through which a user can scroll and select a Web page of interest to review. Such online catalogs are also compiled with human assistance but have no associated search engines.

Web-based intelligent agents with neural networks have been developed to search the Internet. For example, Autonomy Inc. of the United Kingdom has developed Agentware software which uses agents, neural networks and pattern matching to identify Web pages to provide categorization and cross-referencing of digital information. However, such Web-based intelligent agent technology often requires constant supervision for operation. Queries to be used by agents are stated in simplistic abbreviated form. Further, such agents do not learn or rely on a single machine learning mechanism, and often are limited to queries of text-based tasks. They are unable to initiate actions autonomously or operate autonomously. These agents further do not evolve into new agents which can potentially improve the ability to classify Web pages without user intervention, and their ability to be trained by user feedback or other knowledge inputs are highly circumscribed. Web agents with the ability to learn are described, for example, in L. Chen & K. Sycara, 1998, "WebMate: A personal agent for browsing and searching", Proceedings of Autonomous Agents 98, pp. 13 2-13 8, T. Joachims, D. Freitag & T. Mitchell, 1998, "Web Watcher: A tour guide for the World Wide" Web, Proceedings of IJCAI 97, and M. Pazzani, J. Muramatzu, D. Billsus, 1996, "Syskill & Webert: identifying interesting Web sites", Proceedings of AA-Al conference.

Some existing Web agent systems can deploy multiple agents for the same core query, as provided by the MetaBot search engine, but there is usually no inter-agent communication or inter-agent learning. Multiple Web agents are used only as a means of speeding the recovery of data, not as a means of improving the retrieval performance of the system.

To facilitate searching the WWW for information, meta-searching programs have been developed to query multiple Web search engines and combine the results of the searches. This can provide a more complete search of the WWW than can be provided by any single Web search engine. The company Agent Technologies Inc. has developed software called Copernic98Plus having the capability to search multiple content-specific sites and simultaneously searching more than a hundred search engines using smart agents. Meta-searching programs however are limited to operating on the results of searches from Web search engines and do not utilize Web crawling to locate documents.

It is thus desirable to provide a system which allows a user at their computer to retrieve desired information on the WWW from their computer by combining the search capability of Web crawling with the meta-searching of multiple Web search engines using agents which learn and evolve as the search progresses.

SUMMARY OF THE INVENTION

Accordingly, it is the principal object of the present invention to provide a system for retrieving information from the Internet, and particularly the WWW, using multiple intelligent agents, which can more efficiently retrieve document than prior art Web agent systems by integrating both meta-searching and crawler agents.

It is another object of the present invention to provide a system for retrieving documents using multiple agents which are adaptive is the capability to learn from the user and the experience of other agents, evolve as a group, and operate cooperatively to retrieve the desired information.

It is still another object of the present invention to provide a system for retrieving information from the Internet using multiple agents each having a common neural network in which the relevancy of documents, i.e., Web pages, retrieved from agents is determined by either user, or automatically by the system, for expanding, training, and evolving the neural network of such agents.

Yet another object of the present invention is to provide a system for retrieving documents which operates autonomously on behalf of the user to retrieve desired information.

It is a further object of the present invention to provide a system for retrieving information from the Internet using multiple intelligent agents and natural language processing of the query for building the artificial neural network for the agents, and natural language processing of the retrieved documents to be applied to the artificial neural network of agents.

A still further object of the present invention is to provide a system for retrieving information from the Internet using multiple agents in which the information received can be of one or more different media types.

Briefly described, the present invention embodies a system for retrieving information on a computer coupled to a computer-based network, such as the Internet, in accordance with a query. The system includes a Web browser and a graphic user interface through which the Web browser enables a user to input information defining a user search profile, including a natural language query, the media type of document desired, and any starting network addresses. The system further includes an agent server for producing multiple crawler agents and meta-search agents under an agent leader associated with the user profile. The agent server stores records in a database, via a database server, defining the user profile for the agent leader and other information, including the search results. Each crawler agent retrieves documents from the network at a different starting network address and at other addresses linked from the document at the starting network address, and so on. Each meta-search agent executes a search on different search engines addressable on the network in accordance with the query to retrieve documents at network addresses provided by the search engine. A natural language processor enables the agent server to determine the subject categories and important terms of the query, and determines the subject categories and important terms of the text of each agent retrieved document. The agent server uses the subject categories and important terms from the natural language processed query to establish an initial set of inputs for a neural network, trains this neural network in accordance with test patterns based on the natural language processed query, and then embeds the neural network in each of the crawler and meta-search agents. During the search, when each of the crawler or meta-search agents retrieves a document, the neural network of that agent processes the document's associated subject categories and important terms from the natural language processor to determine a retrieval value for the document. For each retrieved document, its network addresses and retrieval value are stored in a database. The agent server displays to the user, via the graphic user interface, the addresses of the retrieved document which have a retrieval value above a threshold level. The user may use the Web browser to review the retrieved document. The user can select which of the retrieved documents are relevant by reviewing the documents at their associated network addresses, or the agent server automatically select a certain number of the documents having the highest retrieval values as relevant. The relevancy of documents is recorded by setting of their relevancy bits.

To enable the agents to learn, the agent server periodically adds inputs to the neural network of the crawler and meta-search agents in accordance with selected relevant documents based the frequency of the associated subject categories and important terms provided by the natural language processor, and then retrains the neural network using test patterns based on subject categories and important terms of the selected relevant documents.

To enable the agents to evolve, the agent server randomly produces a first generation of agents each having a neural network with a different subset of the inputs (i.e., subject categories and important terms) of the current neural network used by the crawler and meta-search agents. Each of the first generation of agents' neural networks is first trained using a group of the retrieved documents and then tested on their accuracy (fitness) in predicting the relevancy of another different group of the retrieved documents. The next generation of new neural networks is then produced having inputs again having a different subset of the inputs of the neural network used by the crawler and meta-search agents, but with a greater chance of including the inputs of the artificial neural network of agents which provided better prediction accuracy of relevance and non-relevance. The training, testing, and evolving of successive generations of agents continue in this manner until a maximum number of generations are produced, or the generations stabilize. The agent of the last generation with the best prediction accuracy replaces the current neural network embedded in each of the crawler and meta-search agents. Thus, agents both learn and evolve as a group in which inter-agent communication is achieved by using the documents retrieved by all crawler and meta-search agents for learning and evolving. Further, the information of the documents retrieved may be of one or more multiple media types, such as text, graphic, audio, video, or any, as defined in the user profile.

During the search, one or more of the addresses of the document retrieved from the meta-search agents may become a new starting address for a crawler agent to search the WWW. The search continues until stopped by the user.

BRIEF DESCRIPTION OF THE DRAWINGS

The foregoing objects, features and advantages of the invention will become more apparent from a reading of the following description in connection with the accompanying drawings, in which:

FIGS. 2A and 2B are connected flow charts showing the operation and programming of the system of FIG. 1;

DETAILED DESCRIPTION OF THE INVENTION

Figure 1:
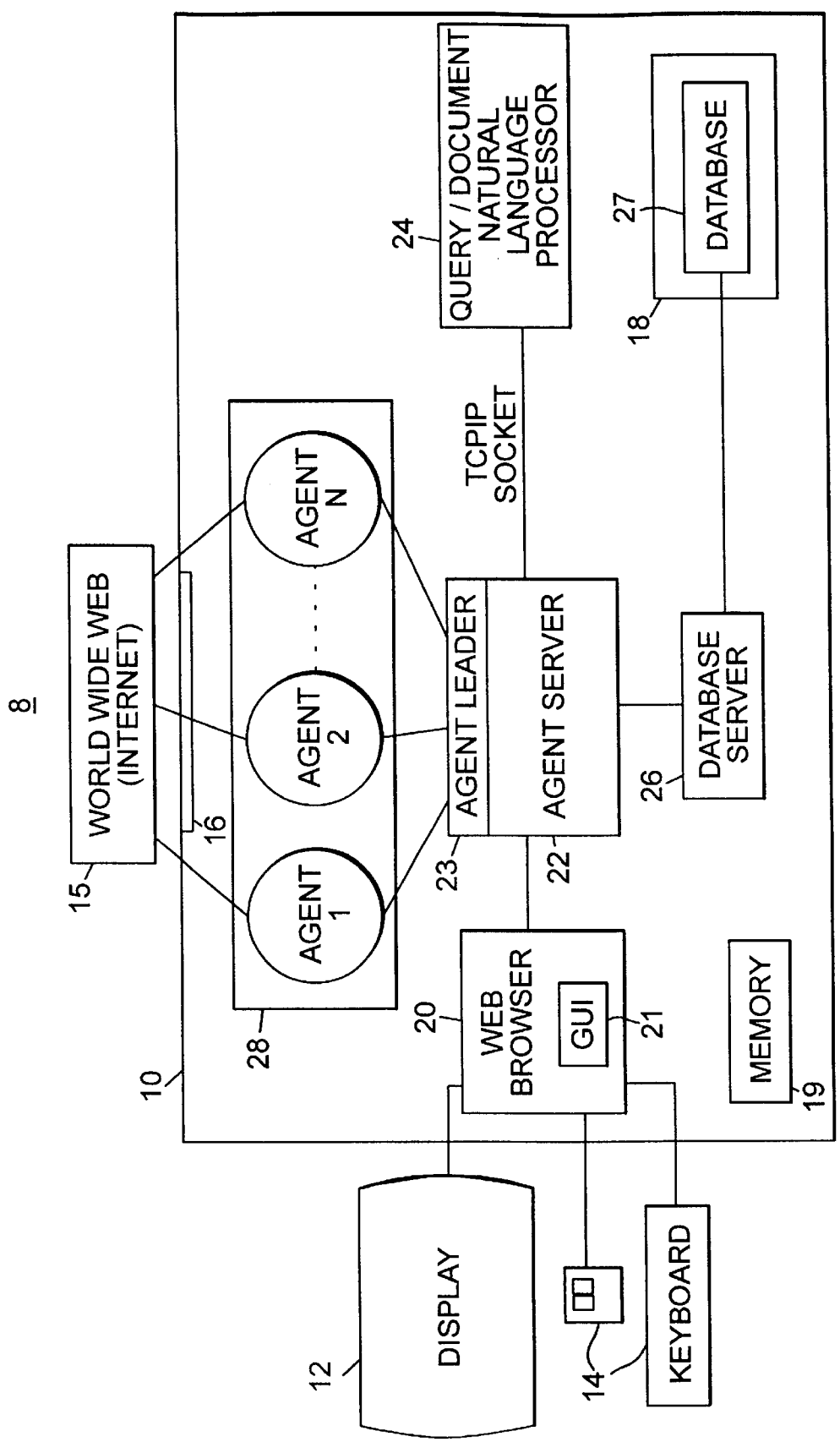
FIG. 1 is a block diagram of the system in accordance with the present invention.

Referring to FIG. 1, the system 8 of the present invention is shown having a computer system 10 coupled to a display 12 and a user interface 14, such as a keyboard and mouse. Computer system 10 represents a typical desktop personal computer, lap-top computer, or workstation of a user. Computer system 10 is coupled to the Internet, and particularly the World Wide Web (referred to herein as WWW or the Web) 15, via a network interface 16, such as a modem, LAN, or cable to an Internet Service Provider. Alternatively, computer system 10 may be a network computer server coupled to the Internet via a high-bandwidth Internet connection, such as a shared T1 line. Other peripheral devices, not shown, such as a printer or CDROM, may also be coupled to computer system 10. The computer system 10 further includes a hard-disk drive 18 and memory (RAM) 19 for program and related data storage.

The following terminology will be used in this description. The term agent refers to a software component which functions continuously and autonomously along the WWW and has artificial intelligence in the form of a neural network to learn as it carries out retrieval tasks. The term document refers to an HTML Web page retrieved by an agent at an address on the Internet. Each document may have text, graphics, and hyperlinks to other HTML Web pages, as typical of HTML Web pages. The term address refers to a Universal Resource Locator (URL) on the WWW of a document retrievable from a Web site. The term query represents text defining the information the user wishes to retrieve in documents from the WWW. The term training refers to the determination of weights for an artificial neural network based on training patterns, and the term evolving refers to the creation and training of new generations of agents having artificial neural networks which can better classify information than their parent agents.

The computer is programmed in accordance with software providing the following components, which will be described later in more detail: a Web browser 20, a graphic user interface (GUI) 21, an agent server 22, a natural language processor 24, and a database server 26 coupled to a database 27. The Web browser 20 may be any typical Web browser software, such as Microsoft Internet Explorer or Netscape Navigator, to access sites on the network 15 via the network interface 16. The GUI 21 is an HTML page (or linked HTML pages) enabled through the Web browser 20 at a location (or file) on the hard-drive 18. GUI 21 defines the screen or screens for enabling a user to input information defining a user search profile (referred to hereinafter as user profile) to view the results of an ongoing search, such as addresses (URLs) of retrieved documents, to select which of the documents are relevant, and to link to the address of retrieved documents on the WWW through the Web browser 20. The information of a user profile includes at least a query, but can define the starting addresses to be searched, the media type of documents to be retrieved, such as text, graphic, audio, video, or any, or documents at particular domain types, such as org, .com, or .gov. The GUI 21 may be constructed from JAVA applets to build the windows to input and display information from the agent server, and buttons to execute functions. An example of the GUI 21 will be described later in connection with FIGS. 3A and 3B.

The natural language processor 24 may be any natural language processing means capable of analyzing text to determine, at a minimum, the key terms associated with the text. Preferably, the natural language processing is provided as described in U.S. Pat; No. 5,873,056, or the subject categories and important terms in the natural language processing described in U.S. patent application Ser. No. 08/696,702, which are herein incorporated by reference. Other articles describing the natural language processing are E. D. Liddy et al., "Document retrieval using linguistic knowledge," Proceedings of RIAO '94 Conference, 1994, and E. D. Liddy et al., "Text categorization for multiple users based on semantic information from a MRD," ACM Transactions of Information Systems, July 1994. The dictionary (or thesaurus or lexicon) described in the U.S. Pat. No. 5,873,056, as well as the Military Handbook 850: Glossary of Mapping Charting, and Geodetic Terms may be stored in memory 19 of the system and used by the natural language processor 24 to identify the subject categories and important terms present in text.

The agent server 22 operates in accordance with the user profile, received via the GUI 21, to generate multiple agents 28 embedded with a common trained artificial neural network and sends such agents to access Web sites along the Internet 15 and retrieve documents therefrom. The natural language processor 24 is coupled to the agent server via the Internet communication protocol TCP/IP to facilitate the transmission of data to the natural language processor. The natural language processor 24 is utilized by the agent server 22 to determine the subject categories and important terms of the query of a user profile. Using this information, the agent server 22 builds an artificial neural network and generate an initial set of training patterns for the neural network. The artificial neural network represents a typical three level feed-forward artificial neural network having an input layer, a hidden layer, and an output layer of artificial neurons in which each path from one neuron to another has a weight. The input layer represents input artificial neurons in which one input is provided for each subject category and important terms from a natural language processed query. The output layer consists of a single output neuron and the hidden layer represents the artificial neurons between the input and output layers. The agent server 22 trains the artificial neural network to determine a retrieval status valve (called herein after retrieval value) based on the frequency or absence of the subject categories and important terms of the query as determined by a real number value between 0 and 1, respectively, at each input of the artificial neural network. At the input of the artificial neural network, the real value is the number of times the subject category or important term associated with that input appeared in the natural processed text divided by the total number of times all subject categories and important words appeared in the natural processed text. For example, if the natural language processed query had three words, two being the same subject categories and the third an important term, then the input associated with the subject category would be 0.67 (⅔) and the input associated with the important term would be 0.33 (⅓).

Each document retrieved by an agent is sent by the agent server 22 to the natural language processor 24 to obtain the subject categories and important terms of the text within the HTML file associated with the document. The agent server 22 returns this information to the agent which retrieved the document which sets each artificial input neuron based on the frequency or absence of the subject categories and important terms in the natural processed text of the document as determined by a real number value between 0 and 1. At the input of the artificial neural network, the real value is the number of times the subject category or important term associated with that input appears in the natural processed text of the document divided by the total number of times all subject categories and important words of the query (at all inputs) appear in the natural processed text of the document. If the category or term associated with an input is not present in the natural language processed text of a document, then that input is set to "0". The output neuron provides a retrieval value in the range of 0 to 1 for the document, where the higher the value the greater the proximity (or match) of the content of the document is to the natural language processed query. As documents are retrieved, the agent server 22 enables the agents to learn and neurogenically evolve their artificial neural network based on agent retrieved documents.

The agent server 22 can enable multiple searches of the WWW under different user profile information to take place concurrently or successively as the user directs, by providing an agent leader 23 within the agent server 22 for each user profile for creating, training and evolving multiple agents. The programming and operation of the agent server 22 will best be described later in connection with the flow charts of FIGS. 2A and 2B.

The database 27 includes tables having linked records for storing information for each search of the WWW. The database server 26 represent software, such as Postgres, Oracle, or MicroSoft SQL Server, which updates (adds, delete, modify) the records in the database in accordance with transactions received from the agent server 22. The database 27 contains for each user profile entered by a user through the GUI 21 a record in an Agent Leader Table having fields for storing information about the search: the original query provided by a user; the subject categories and important terms from the natural language processed query; the starting addresses for Web crawling; search results representing the addresses (URLs) of each retrieved document, their retrieval value, a relevancy bit indicating whether the document was selected as relevant, and an optional unique document identifier assigned by the agent server to the document; information defining the artificial neural network including the inputs (i.e., number of input neurons and their subject category of important term), the hidden layer neurons, the output neuron, and weights of all branches between neurons; the user profile defining the type of documents or other user preferences. Other data structure may also be used to store the same information, for example, a data field of a record in the Agent Leader Table may have an identifier linked to stored records in other related tables.

The subject categories and important terms associated with each retrieved document may be stored with the search results in the record of the Agent Leader Table. However, the database may further include a Processed Document Table having records storing, for each document, the subject categories and important terms of the natural language processed text of the document. The records in the Processed Document Table may be linked to the stored search results in the Agent Leader Table by document identifiers. The agent leader is capable of retrieving, adding, updating, and removing records from the Agent Leader Table and record of its related tables. Further, each subject category and important term is associated in an Ontology Table stored in database 27 with a unique code (or an identifier) used by the system for internal processing purposes. For example, each code may be a unique 32-bit number, and the output of the natural language processor may actually be a series of codes representing the subject categories and important terms of the inputted text.

The computer system 10 may further include a start-up program, such as a batch file, which when executed by a user executes the programs stored on the hard-drive for running the components 19–26. The software of the agent server 22 may be programmed using the JAVA programming language in combination with C++ which defines program elements in terms of classes and objects. For example, in JAVA each agent leader represents a class which enables agent program objects to search the WWW. However, programming may be in other programming languages.

Figure 2B:
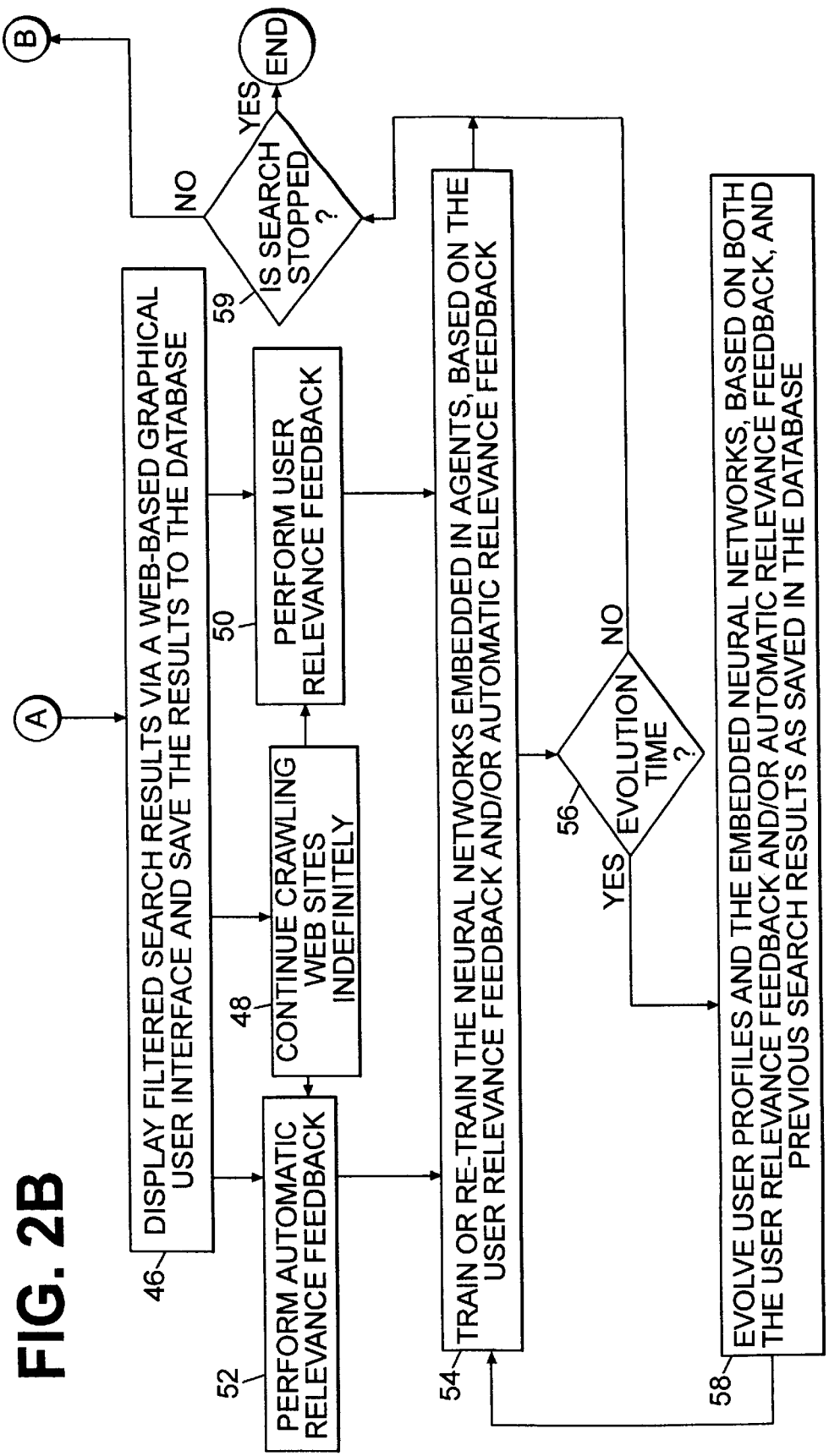

Referring to FIGS. 2A and 2B, a flow chart of the operation and programming of the computer system 10, and particular agent server 22, is shown. First, a user accesses the GUI 21 through the Web browser 20 at address line 59 and enters information of a user profile defining the desired search (step 30). One screen of the GUI 21 on display 12 may be, for example, the page shown in FIG. 2A. As in typical HTML pages, the selecting of buttons or drop down menu items on the GUI 21 is facilitated by clicking the mouse of the user interface 14 over the screen area associated with the button or menu item. Each user profile is defined by a name to identify both the user profile and the associated agent leader. This name is inputted in data field 60 by the user via the keyboard 14. The user then clicks on the create agent button 62a to establish the agent, and the setting button 62b to receive page 64 allowing the user to enter the information (setting) defining the user profile to search the WWW under the agent leader. This information includes the query (data field) 65, the search type 66 (i.e., a drop down menu to set to the type of multimedia information to be retrieved, such as graphic—gif files, audio, video, text, or any type), and any starting page addresses 68. The starting page addresses represent the addresses at which different crawler agents will start searching the WWW. The query may be, for example, up to 100 characters. The starting pages may be added by the user entering the address in data field 68 and then clicking on an add starting page button 70a. The starting page addresses will appear in the box 71 representing the current starting pages. To remove a starting page, the user clicks on an address in box 71 until highlighted, and then on a remove starting page button 70b. The user is not required to enter any starting page addresses. The automatic timeout data field 69 may be entered with a number representing the number of minutes the system will wait to allow the user to manually select the relevant document retrieved before automatic relevance feedback is performed, as will be described later.

If the user wishes, a Process Query button 76 may be selected, which directs the agent server 22 to send the query to the natural language processor and show the results to the user in data field 64, such that the user may review the results of the query prior to starting the search. To assist the user in selecting stating page addresses, the database may store a table having records by subject categories listing recommended starting addresses associated with such subject categories. If the Process Query button 76 is selected, the agent server 22 checks such records for any subject categories of the natural language processed query, and displays them through a recommended pages box 75 of the GUI 21. The user may double click on any addresses appearing in box 75 to add them to box 71, such as shown, for example, in FIG. 3A. Additional information for the user profile may also be added by data field or drop down menus, such as the desired domain extension to be searched, and an evolve time in terms of a time which when matching the computer's clock IO directs the agent server 22 to evolve the agents. The evolve time may default to midnight. To start the search in accordance with the user profile information entered on page 64, the user clicks with an apply button 72, otherwise, the user may click on button 74 to delete box 64 and any user inputted information therein.

Figure 3A:
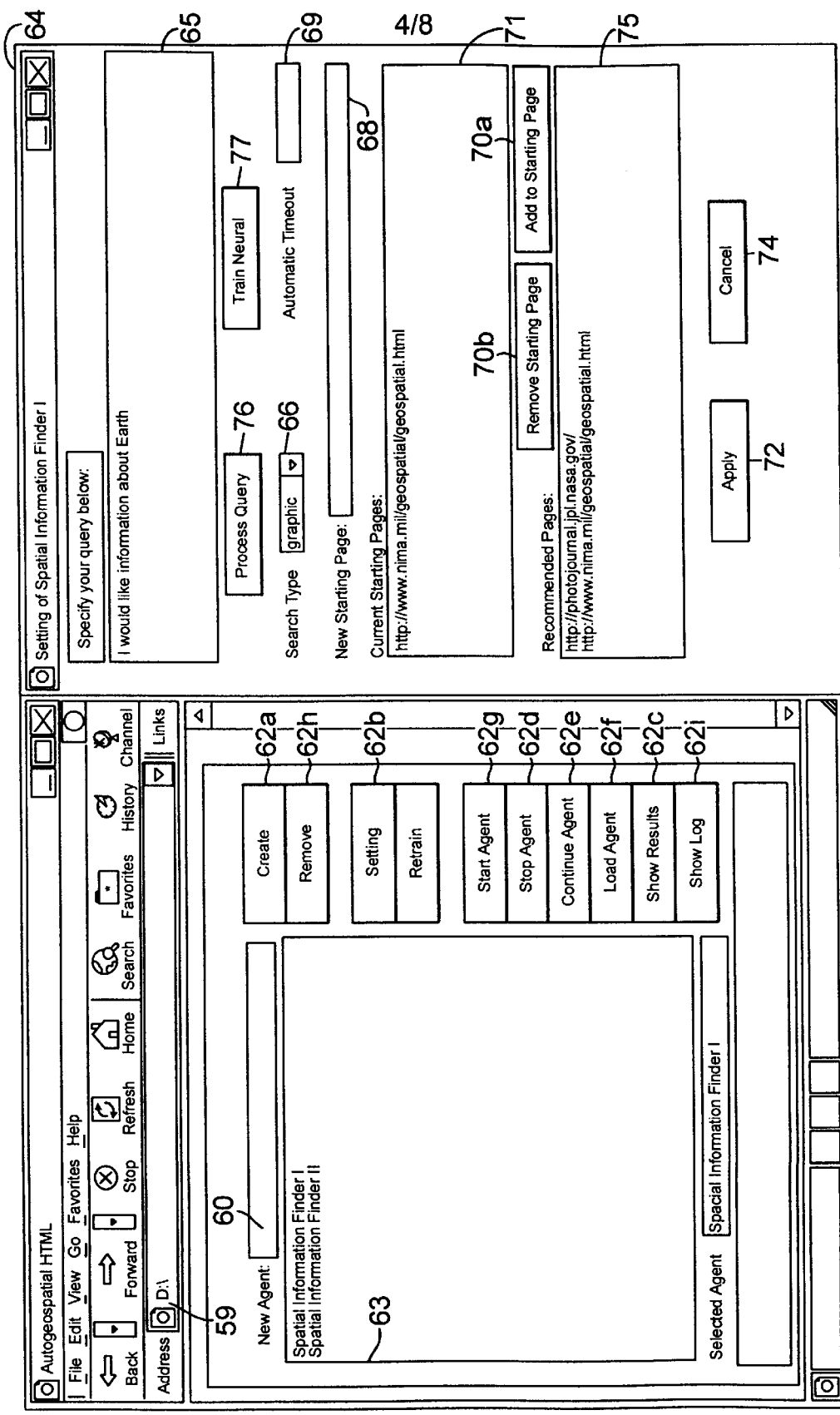
FIGS. 3A and 3B are examples of the graphic user interface of the system of FIG. 1.

With the user profile information entered, the agent server 22 receives and processes the information from the GUI 21 (step 32). If the query has not yet been processed by the natural language processor, the agent server 22 sends the query to the natural language processor 24, which processes the text of the query and returns to the agent server the subject categories and important terms of the query. The agent server 22 then creates an agent leader for the user profile (step 34) in which a record is created in the Agent Leader Table of database 27, via the database server 26, storing the original query, and the natural language processed query, and other information received from page 64 of the GUI 21. In parallel with step 34, the agent server 22 initializes the artificial neural network using the processed query from the natural language processor (step 36). To achieve this, an input neuron is defined for each subject category and important term, and an output neuron is defined with a layer of neurons therebetween (generally equal to the number of input neurons), where the weights of the connecting branches between neurons are to be determined by training. Two training patterns are created based on the natural language processed query: one pattern indicating a relevant document is present by each of the inputs being "1" and the output "1", and the second pattern indicating the absence of a relevant document by each of the inputs being "0" and the outputs "0". A back-propagation learn algorithm is used to determine the weights using the two training patterns, as developed by Rumelhaut, such as described in Y. Chauwin & D. E. Rumelhart (eds), Backprogation: theory, architectures, and applications, Lawrence Erlbaum (1995). Information defining the trained neural network is added to record of database 27, via the database server 26. The user through GUI 21 may manually instruct the agent server 22 to perform step 36 before clicking the apply button 72, such as by first clicking on the process query button 76 and then on a train neural button 77 (FIG. 3A).

Next, the agent leader of the agent server 22 for the user profile generates a team of agents in which each agent is embedded with the trained artificial neural network from step 36 (step 38). For purposes of illustration, the agents under an agent leader are denoted as 28 in FIG. 1. There are two types of agents generated: crawler agents and meta-search agents. Each of these agent types is capable of connecting to a Web site at an address on the WWW through the Web browser and thus establishes a session with that Web site. Thus, when connected, an agent represents a network client to Web site, i.e., the network server at that site, and the document (HTML page) at that address can be received by the agent at computer system 10 (FIG. 1). The agents timeshare the Web browser's connection to the Internet. However, if computer system 10 had a high bandwidth Internet connection, multiple concurrent connections could be established to the Internet.

The meta-search agents are sent to general purpose search engines on the WWW (step 40) and specialized search engines on the WWW (step 42). Each meta-search agent is assigned to a different search engine on the WWW. General search engines may be for example, Lycos, AltaVista, Yahoo, Snap, and others, while specialized search engines may be those dedicated to a particular area of information, for example, Getty Thesaurus of Geographical Names (http://www.ship.getty.edu/tgn$_{13}$ browser/) or The Art & Architecture Thesaurus Browser (http://www.ship.getty.edu/aat$_{13}$browser/). For each meta-search agent, the agent server 22 converts the subject categories and important terms of the natural language processed query into a search query for input to the engine. This is needed to account for differences in how searches are formatted on different search engines. For example, if the query is "I would like information about Earth", the natural language processed query may consist of planet and Earth, a subject categories and an important term, the search query may be "query=planet+Earth", where "+" indicated the boolean AND for the search engine. Each meta-search agent connects to the search engine at their address on the WWW, stored in a file in database 27, enters the formatted query at the search engine's Web page, and executes the search and retrieves the documents one at a time from the results pages provided by the search engine. This is achieved by the meta-search agent's capability to recognize each of the URL addresses in the HTML code of the results page of the search engine.

The crawler agents are sent directly to Web sites (step 44). Each of the crawler agents can be sent to a first Web address to retrieve the document at that address to the computer system 10, and then proceed to retrieve other documents at other Web address defined in hyperlinks of the document of the first Web address, and so forth. No restrictions need be placed on the number of levels of linked documents from the document at the first Web address. If any crawler agent locates multiple link addresses in a document, the address is temporarily stored in a queue in memory 19 until the same of another crawler agent is available to retrieve a document from the WWW associated with that address. The agent leader retrieves any starting addresses stored in the record for the agent leader in the Agent Leader Table, and sends one crawler agent to each of the starting addresses. The agent leader continues to add to the start address list in the record of the Agent Leader Table a predefined number of the top URL addresses provided by the meta-search agents, such that crawler agents can start crawling from such URL addresses. This is indicated by arrows 41 and 43 from steps 40 and 42, respectively. For example, the first ten addresses retrieved by each meta-search agent may be added to the start address list.

The number of crawler agents is variable. The agent leader can dynamically create new crawler agents and delete old crawler agents, as needed within the available computing resources of the computer system 10. The agent leader can reuse existing crawler agents which have stopped crawling due to all addresses linked to their stating address have been retrieved. If the computer has insufficient computing resources to create all the crawler agents or meta-search agents, the agent leader waits until such resources become available to send the agent to the WWW. If a crawler agent task is completed in that all linked documents from the first address have been retrieved, or a meta-search agent task is completed in that all documents from an executed search engine have been retrieved, the agent leader terminates the agent, thus freeing computer resources to allow the agent server to create new agents.

The agent server 22 at steps 40, 42, and 44 determines whether the documents retrieved by agents include a particular media type when such media type was selected by the user in the user profile. For example, if only graphics was selected. Different media types are recognizable by being in a different format, code, or tag when received in the HTML code representing the document. When a particular media type is selected by the user, the document is not processed by the system except for identifying any further hyperlink addresses for crawling by crawler agents.

As each crawler agent and meta-search agent retrieves a document, the agent server sends the document to the natural language processor 24 to obtain the subject categories and key terms of the text of the document, and filters this information through the agent's embedded neural network (step 45). This is achieved by setting any of the input neurons of the artificial neural network associated with subject categories or important terms with a real number based on the frequency of the subject categories or important terms occurring in the natural language processed document, such that the value from the output neuron represents the retrieval value for the document. As describer earlier, the real value number at the input of the artificial neural network represents the number of times the subject category or important term associated with that input appeared in the natural processed text divided by the total number of times all subject categories and important words of all inputs appeared in the natural processed text of the document.

The agent server 22 displays each of the documents from the search to the user through the GUI 21 which are above a threshold retrieval value, such as 0.3 (step 46). These are called matches. The results are outputted, for example, at window 78 in FIG. 3B. The agent leader ranks by their retrieval value in window 78, and continuously updates the rank as new documents are retrieved by agents. Each entry on the list of documents in window 78 represents the address (URL) of a document. However, additional information may be provided, such as the documents' retrieval values. The area of each document address on the GUI 21 represents a hyperlink to the Web site, which may be double-clicked upon by the user to review the document.

All results are also stored in the database in terms of the address of the document, its retrieval value, and a relevancy bit, which may be set as described below. Due to the large number of documents which may be retrieved, the agent server 22 may retain only a certain number of documents in the search results of the database, such as 100 or 200, having the highest retrieval values. As stated earlier, an identifier may be assigned to the document in the database to link the document to a record in the Processed Document Table storing the results from the natural language processor for the document.

As indicated by step 48, the crawler agents continue to search Web sites and retrieve documents. The meta-search agents also continue to retrieve the documents appearing in the results page(s) of their respective search engines, however, their operation will eventually cease when all such documents from results page(s) have been retrieved.

Figure 3B:
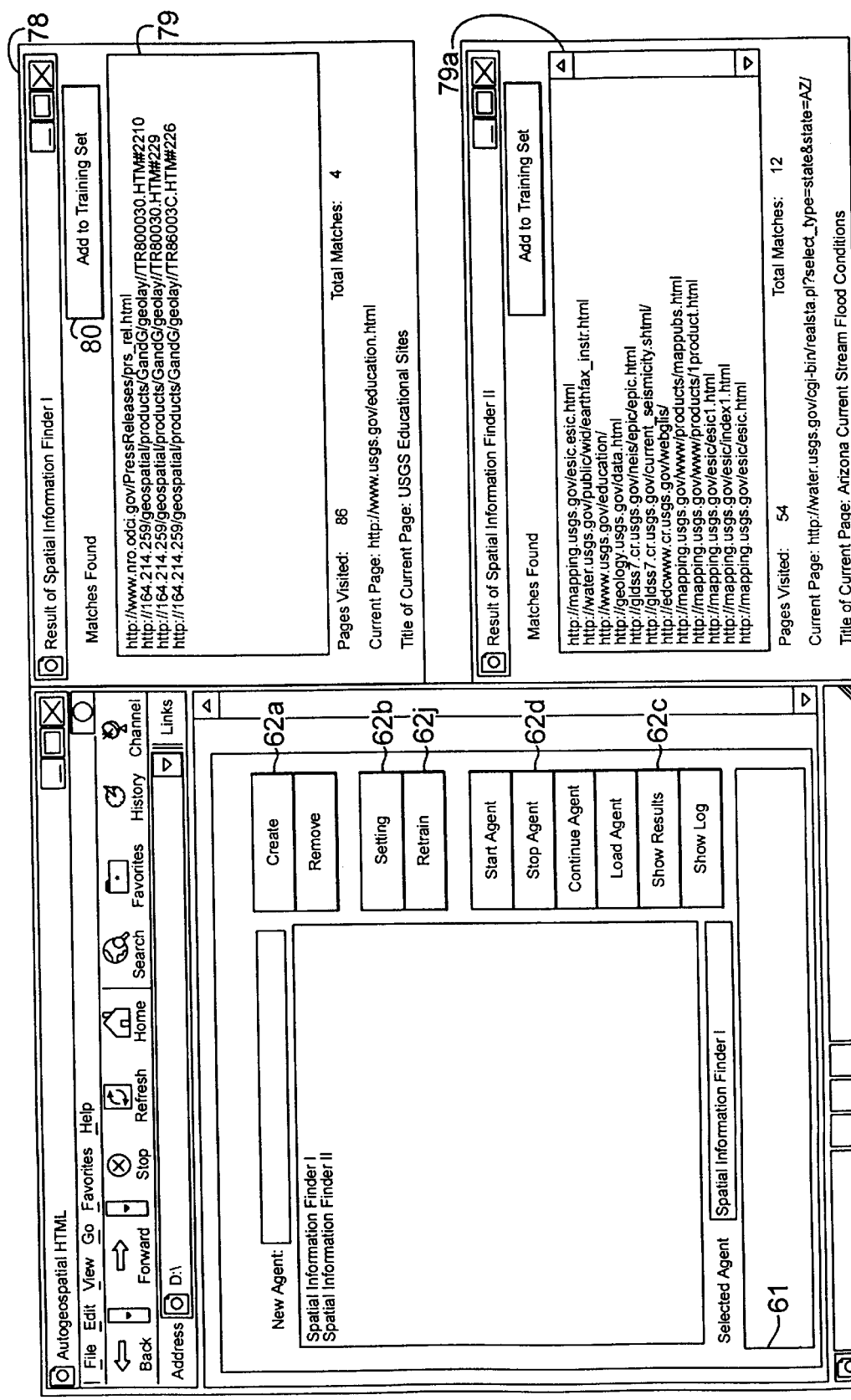

The user at step 50 has the option of selecting the most relevant documents on the display. Such documents represent a new training set for the artificial neural network. In the example of FIG. 3B, the user may single-click upon the area of a document address in window 78, and then on button 80 to indicate that the document is relevant to the query by adding the document to the training set. Alternatively, a radio button or check box may be displayed adjacent each listed document to enable the user to select a document as relevant, and further enable the user to change the docu-ments considered relevant. When a document is selected by the user as relevant, the agent server, via the database server, records this in the database by setting the relevancy bit associated with the document to "1", otherwise the relevancy bit is "0". If the user changes a document from relevant to non-relevant, the agent server changes the relevancy bit of the document accordingly. The user can select which documents are relevant at any time during the search.

Periodically, the agent server 22 retrains (or trains) the artificial neural network common to all agents under an agent leader in accordance with the training set of relevant documents (step 54). The interval between training sessions may be a parameter set by the user. For example, the interval may be 15 minutes. When training is to about to occur, if the user has not selected any relevant documents, the agent server 22 automatically performs relevance feedback at step 52 by considering the top X number of document having the highest retrieval value as relevant and includes such documents in the training set by setting their relevancy bits in the database to "1". For example, X may equal 10, however other numbers may be used. If the user has selected less than X number of documents as relevant, the automatic relevant feedback may be performed to supplement the number of documents in the test set until X documents are present. Similar to the user selected relevance, the documents which are considered relevant are indicated in window 78. The user at step 50 may later add or change the relevancy status of any document whether automatically or manually selected as relevant. The agent leader can change a document from relevant to non-relevant by changing the relevancy bit, but it cannot affect the relevancy bit of a document once selected relevant by a user at step 50. Memory 19 stores a list of any documents selected relevant by the user by the document's address, such that such documents are excluded from any future automatic relevance determination at step 52. The agent leader records in memory 19 a list of the documents automatically determined relevant by their address. Thus, for example, a user may wait an hour after a search commences until performing user relevance feedback, such that six training artificial neural network training sessions would occur.

Figure 4:
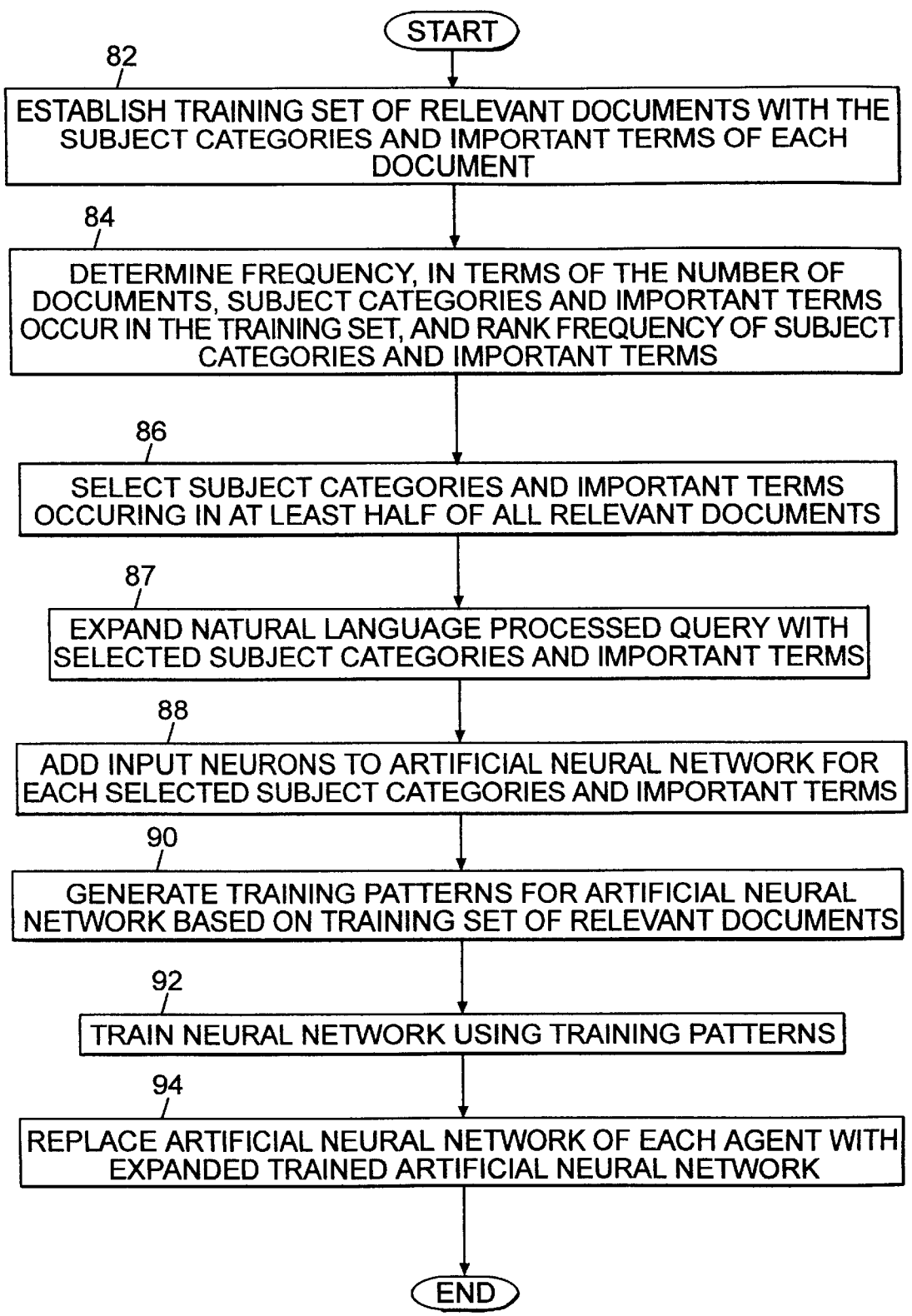
FIG. 4 is a flow chart showing the operation and programming for training the neural network embedded in agents searching the WWW in the system of FIG. 1.

Referring to FIG. 4, the retraining of the artificial neural network at step 54 is described in more detail. First, a training set of relevant documents is established in memory 19 by retrieving any documents stored in the search results of the database for the user profile having a relevancy bit of "1". The agent server adds to each document in the training set their subject categories and important terms as stored in the records of the Process Document Table (step 82). Next, the agent server determines the frequency, in terms of the number of documents of the training set, each of the subject categories and important terms occur in the training set, and ranks the subject category or term is from most to least frequent in documents (step 84). This may be achieved by statistically counting the number of documents of the training set each different subject category or important terms occur. The subject categories and important terms which occur in at least half of all documents are then selected (step 86). The natural language processed query is expanded to include the selected subject categories and terms (step 87). The database is modified by the agent server, via the database server, to add the selected subject categories and terms to the stored natural language processed query.

While the agents continue to use the current artificial neural network, the agent server at steps 88, 90 and 92 modify and retrain the artificial neural network, which when complete, will replace the artificial neural network embedded in each agent, thereby enabling the agent to learn. At step 88, an input node is added to the existing artificial neural network for each of the selected subject categories and terms. At step 90, training patterns are generated based on the documents in the training set. For each document in the training set, an input pattern is generated which should lead to an output of "1", i.e., a relevant document, from the neural network, such that inputs of the neural network associated with subject categories or important terms have a real value number between 0 and 1 based on the frequency of the occupance of the subject categories and important terms of the document, as described earlier. Using the same training technique described earlier in connection with step 36, the neural network in accordance with the expanded query in trained based on the training set of step 90. The training may be considered retraining in which the current weights are used, or training in which all the weights of the artificial neural network are determined. The trained neural network then replaces the embedded artificial neural network of each agent under the agent leader, and is stored in the neural network information in the database by the agent server, via the database server (step 94). The user may manually instruct the agent leader to perform step 54 through the GUI 21, such as by clicking on a retrain button 62*j* (FIG. 3B).

After retraining of the artificial neural network of each agent based on the training set of relevant documents is complete, the agent server 22 checks if it is time to evolve the embedded neural network of each agent at step 56 of FIG. 2B. If so, the agent server will evolve the neural network based on the user or automatic relevancy feedback indicated by the relevancy bits in the search results stored in the database (step 58). The evolution time may be a clock time set by the user via the GUI when the user profile was entered, or may be on a periodic interval. For example, if a search commenced at 9 PM, the user may select the evolution time at 1 AM each day, or the evolution may periodically at other intervals.

Figure 5B:
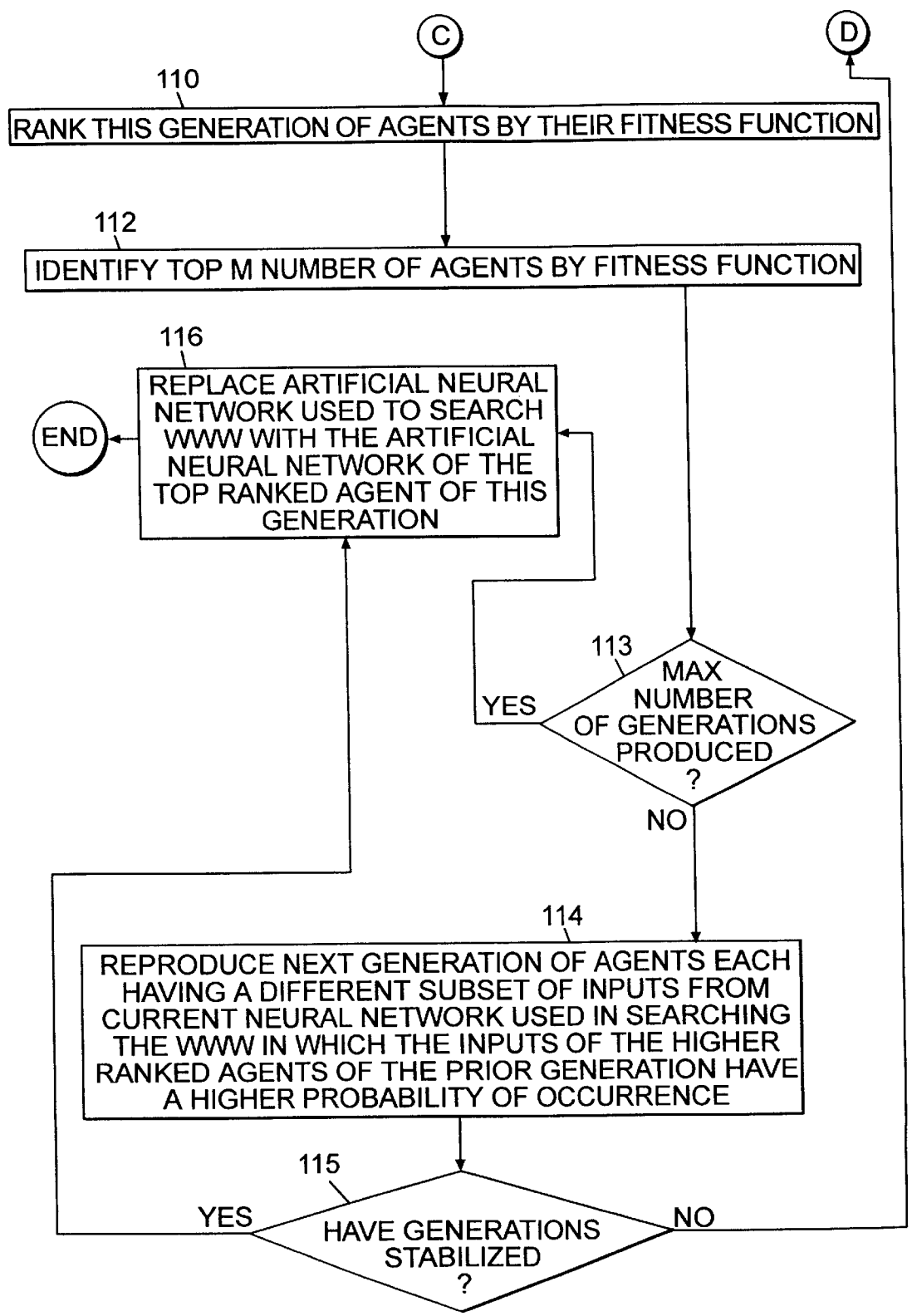
FIG. 5 is a flow chart showing the operation and programming for evolving the neural network embedded in agents searching the WWW in the system of FIG. 1.

Referring to FIG. 5, the evolving of the artificial neural network at step 58 is described. The agent server 22 first obtains the documents stored as search results in the database through the database server and temporarily stores them in memory 19 by their address with their subject categories and important terms (step 96). A majority of the documents are allocated as a training document set and the remaining a test document set (step 98). For example, in the case where the search results stored a hundred retrieved documents, ninety would represent the training document set and ten the test document set. The agent server 22 then generates a number of first generation of agents (step 100), and provides each such agent with a different neural network having a different subset of one or more of the inputs (or features) of the current neural network embedded in crawler and meta-search agents of steps 40–42 (step 102). The subject categories and important terms used as inputs for each first generation of agent are randomly selected using typical random number techniques in which each input has an equal probability of occurrence. The number of agents in each generation may be twenty, however, other number of agents may also be used. The artificial neural network is structurally the same as the artificial neural network described earlier, except each network has a different set of inputs.

For each first generation of agent, a series of training patterns for its artificial neural network are generated based on the training document set (step 104). This is identical to the generation of training patterns described earlier at step 90, except the desired output is "1" if the relevancy bit for a document is set to "1" or "0" if the relevancy bit is set to "0". Using the same training technique described earlier in connection with step 36, each of the first generation agent's neural networks is trained based on their respective training set (step 106). After the first generation agents are trained, the agent server applies each agent to each of the documents in the test document set to determine how may document each agent correctly classifies as relevant and non-relevant, as determined by the relevancy bit of the document (step 108). A document is correctly determined relevant if it value was above 0.5 and the relevancy bit for the document was "1", and a document is correctly determined non-relevant if its value was below 0.5 and the relevancy bit for the document was "0". For each of the first generation of agents, a fitness function is determined defined by the ratio of the number of document correctly classified to the number of document in test document set is determined. The agents are then ranked by their fitness function from best to worst classifiers (step 110). Next, the top M number of agents are identified as ranked by their fitness function, for example, M may equal two (step 112). The agent server then checks if a maximum number of generations have been produced (step 113). For example, the maximum number may be twenty generations, but other number of generations may be used. If the maximum number of generations has been reached, the yes branch is taken to step 116. At step 116, the evolution of agents is complete, and the agent server replaces the artificial neural network used to search the WWW by each of the crawler and meta-search agents with the evolved artificial neural network of the top ranked agent of the last generation. Information on the evolved neural network replaced the information of the old neural network in the database by the agent server, via the database server. Furthermore, the natural language processed query is revised to include the subject categories and important terms associated with the input neurons of the evolved artificial neural network.

If the maximum number of generations has not been reached, the no branch is taken to step 114. At step 114, a second generation of agents is reproduced each having a subset of neural network inputs (or features) of one or more of the inputs of the current neural network embedded in crawler and meta-search, where the inputs (subject categories or terms) of the higher ranked agent having a higher the probability of occurring in agents of the next generation. The probability that an agent will be a parent to the next generation is shown in the following equation:

$$p*(1-p)^{n-1}$$

where p is the probability that the highest ranked agent will be selected, which for example is 0.6, and n is the agent's rank from step 110. Thus, the top ranked agent has a probability of 0.6, the next ranked agent has a probability of 0.24, the next ranked agent has a probability of 0.096, and so forth for each subsequently ranked agent. To select each agent, a random number generator outputs a real number value between 0 and 1, such that if this value is between 0 and 0.6 the top ranked agent is selected, between 0.6 and 0.84 (0.6+ 0.24) the next ranked agent is selected, between 0.84 and 0.936 (0.6+0.24+0.096) the next ranked agent is selected, and so forth for each subsequent ranked agent. The inputs of the artificial neural network of the two selected agents determine the inputs of the new agent in which half of the inputs are randomly selected from the first selected agent and half the inputs are randomly selected from the second selected agent. This is repeated for each agent of the second generation until the total number of agents of this generation equals the number of the previous generation plus the top M agents of the previous generation. The second generation of agents includes the top M agents of the prior generation.

The agent server 22 then checks if the next generation of agents matches the last generation of agents stored in memory 19 to determine if the generations have stabilized. This may be determined by all the agents of a generation being the same, or the highest ranked agent of two successive generations having the same (or approximately the same) fitness value, or the average fitness value of two successive generations of agents being equal (or approximately equal). If so, the generations have stabilized, and the branch is taken to step 116, otherwise, the training pattern for this generation of agents is defined at step 104 and steps 106–114 are repeated until either the conditions of steps 113 or 115 are satisfied. The resulting evolved neural network should more accurately determine when documents are relevant.

After a new neural network has evolved and has been embedded in the present agents, the agents continue to search the WWW, and the agent leader branches to step 54 to expand the neural network based of the automatic or user relevance feedback, as described earlier. The agents under the agent leader continue to search the WWW until the user stops the search at step 59. A stop agent button 62d (FIG. 3B) on the GUI 21 may be selected by the user to stop the search of an agent leader selected in box 63. The continue agent button 62e may then be selected by the user to continue the search. When a search is stopped, its associated record in the Agent Leader Table is maintained. Data defining the present status of the search in terms of the present address of each crawler agent on the WWW, the contents of the document to be received queue, and any addresses in memory 19 provided from search engines not yet retrieved by meta-search agents, is also stored in a database linked to the name of the agent leader. The user may later load the data for the agent leader by selecting the agent leader name listed in box 63, and clicking on the load agent button 62f to instruct the agent server to load the saved data for a search from the database 27 into memory 19. The settings button 62b may be clicked to direct the agent server 22 to display the user profile information in page 64 for the agent leader, and then the start agent button 62g to direct the agent server 22 to start the search. The user may remove an agent leader from the database by the user clicking on the remove button 62h, which directs the agent server to remove the files associated with the agent leader in the database. FIGS. 3A and 3B show an example the GUI 21. Other pages of a GUI may be used with different fields and buttons to enable a user to interface with system 8 of the present invention.

The database may maintain a log of the events occurring during a search of an agent leader. The log may record, for example, each of the query expansions at step 54 and the state of the query after each evolution. The user may click on the show log button 62i of the GUI 21 of FIG. 3A to instruct the agent server 22 to display the contents of the log from database 27 through the GUI.

Multiple searches may run at the same time by defining multiple user profiles. This is shown for example in FIG. 3B in which the results of a search of another agent leader are provided in box 79a. The status of each search is shown by its agent leader name in the GUI 21, such as in box 61.

Although this description refers to the WWW, computer system 10 may be used for searching one or more databases accessible by computer system 10 on CDROM, hard-disk, modem or LAN, in which the documents stored in the database have text and may be retrieved in accordance with a query.

From the foregoing description, it will be apparent that an improved system for retrieving multimedia information from the Internet using multiple evolving intelligent agents has been provided. Variations and modifications of the herein described system and other applications for the invention will undoubtedly suggest themselves to those skilled in the art. Accordingly, the foregoing description should be taken as illustrative and not in a limiting sense.

What is claimed is:

1. A system for retrieving information on a computer coupled to a computer-based network, such as the Internet, in accordance with a query representing the information a user wishes to retrieve, said system comprising:

means for producing a plurality of first agents and second agents in which said first agents each retrieve documents at a different first network address and at other addresses linked from the document at the first network address, and said second agents each execute a search on a different search engines via the network in accordance with said query and retrieves documents at network addresses provided by the executed search;

said first and second agents each comprising an artificial neural network trained in accordance with said query for determining for each of the retrieved documents by said agents a retrieval value representing the proximity of the content of the retrieved documents to said query; and means for displaying to the user the addresses of the retrieved documents above a threshold retrieval value.

2. The system according to claim 1 further comprising means for enabling said user to input said query.

3. The system according to claim 1 further comprising a natural language processor for determining subject categories and terms representative of said query, and means for generating and training said artificial neural network having inputs in accordance with said subject categories and terms representative of said query.

4. The system according to claim 3 wherein said natural language processor operates on each of the retrieved documents from said first and second agents to determine the subject categories and terms representative of the retrieved document, and each of said first and second agents set the inputs of the artificial neural network of the agent in accordance with the subject categories and terms representative of each of the retrieved documents by the agent to determine the retrieval value of the retrieved document.

5. The system according to claim 1 further comprising means for selecting which ones of said retrieved documents are the relevant to said query.

6. The system according to claim 1 further comprising means for expanding the artificial neural network of said first and second agents in accordance with the frequency of subject categories and terms present in said selected relevant documents, and training said artificial neural network of said first and second agents in accordance with training patterns based upon said selected relevant documents.

7. The system according to claim 6 wherein said expanding and training means is enabled periodically.

8. The system according to claim 1 further comprising means for evolving the artificial neural network of said first and second agents in accordance with said retrieved documents by said agents and said selected relevant documents, in which multiple generations of third agents are generated having artificial neural networks with subcombination of the input of the artificial neural network of said first and second agents and each successive generation of third agents have a higher chance of obtaining inputs of artificial neural networks of third agents of the previous generation which performed best at classifying a group of said retrieved documents as relevant and non-relevant as provided by said selecting means.

9. The system according to claim 1 further comprising means for enabling said user to select one or more retrieved documents on said displaying means as relevant.

10. The system according to claim 1 further comprising means for automatically selecting the relevant retrieved documents.

11. The system according to claim 1 further comprising:
a Web browser; and
a graphical user interface enabled through the Web browser for said user to input said query and information characterizing the type of documents to be retrieved, wherein said query and said information represent a user search profile.

12. The system according to claim 11 further comprising an agent server for receiving said user search profile and generates an agent leader in accordance with said user search profile responsible for enabling said first and second agent producing means.

13. The system according to claim 12 wherein said agent server responsive to receiving multiple different ones of user search profiles generates multiple different agent leaders in accordance with each of said user search profiles, wherein each of the agent leader are responsible for enabling said producing means to provide a different group of said first and second agents under each of the agent leaders.

14. The system according to claim 11 further comprising a database and a database server for storing at least said user profile, information representing said artificial neural network of said first and second agents, and results of the retrieved documents in terms of at least their network addresses.

15. The system according to claim 1 further comprising means for generating and training an artificial neural network common to each of said first and second agents in accordance with said query.

16. The system according to claim 1 further comprising means for enabling said user to select at least one of said first network addresses.

17. The system according to claim 1 wherein at least one of said addresses of documents retrieved by said second type of agents provides one of said first network address.

18. A method for retrieving information on a computer coupled to a computer-based network, such as the Internet, in accordance with a query representing the information a user wishes to retrieve, said method comprising the steps of:
producing a plurality of first agents and second agents in which said first agents each retrieve documents at a different first network address and at other addresses linked from the document at the first network address, and said second agents each execute a search on a different search engines via the network in accordance with said query and retrieves documents at network addresses provided by the executed search;
generating a trained artificial neural network common to each of said first and second agents in accordance with said query for determining for each of the retrieved documents by said agents a retrieval value representing the proximity of the content of the retrieved documents to said query; and
displaying to the user the addresses of the retrieved documents above a threshold retrieval value.

19. The method according to claim 18 further comprising the steps of:
selecting which of said displayed addresses of the retrieved documents are relevant; and
periodically revising and training said artificial neural network of said first and second agents in accordance with said selected retrieved documents.

20. The method according to claim 18 further comprising the step of:
evolving said artificial neural network of said first and second agents in accordance with said retrieved documents and said selected retrieved documents.

21. The method according to claim 18 further comprising means for enabling said user to select at least one of said first network addresses.

22. The method according to claim 18 wherein at least one of said addresses of documents retrieved by said second type of agents provides one of said first network addresses.

23. A system for retrieving information from the Internet utilizing multiple intelligent agents comprising:
a computer system having a graphical user interface to input a query, means for accessing the Internet, means for producing a plurality of agents in which each of said agents retrieves documents at a first address on the Internet and at other addresses linked to the document at the first address, and means for determining the subject and important terms of the text of the query and of each the documents retrieved;
each of said agents having a common neural network for determining the relevancy of each of the document retrieved by the agent, said neural network having a plurality of inputs and an output in which said inputs are based upon the subject and important terms of the query and said output representing a relevance value of each of the documents applied to the neural network;
said computer system having means for training the neural network in accordance with the query, means for selecting which of said retrieved documents are relevant, means for periodically updating the neural network with additional inputs based on the subject and important terms of the selected retrieved documents and training the updated neural network using said selected retrieved documents to provide a retrained neural network for each agent, and means for evolving and training a plurality of different neural networks in which each is based on subset of the inputs of the retrained neural network, and iteritively evolving and training a new set of different neural networks having a subset of the inputs of such evolved trained different neural networks which best classifies documents as relevant until one of the evolved neural networks is the best classifier of documents as relevant to provide said one neural network for each agent; and
said graphic user interface displaying to a user the results of the documents retrieved by said first and second agents.

24. A method for neurogenically evolving a parent artificial neural network having a plurality of inputs each characteristic of a different feature using multiple sets of one or more of said training features in which each set has a classification of a plurality of known classes, said method comprising the steps of:

generating a plurality of agents each having an artificial neural network with a different subset of said features of said parent artificial neural network;

dividing said multiple sets into a training group and a test group;

training the artificial neural network of each of said agents with said multiple sets of said training group;

testing the artificial neural network of each of said agents using said multiple sets of said test group to determine the number of sets correctly classified;

determining a fitness function for each of said agents the number of sets correctly classified by the total number of sets in said test group;

rank the agents by their fitness function;

generating a plurality of next generation agents each having an artificial neural network with a different subset of said features of said parent artificial neural network in which said artificial neural network of the next generation agents has a greater chance of including said features of the artificial neural network of said higher ranked agents of the prior generation;

repeating said training step, testing step, determining step, identifying step and said step of generating a plurality of next generation agents in accordance with said next generation of agents until one of a maximum number of generation of agents have been produced, and two successive generations of agents each having identical features are produced, in which the agent having the highest fitness function represents an evolved artificial neural network.

* * * * *